United States Patent
Ishizuka et al.

(10) Patent No.: US 11,746,881 B2
(45) Date of Patent: Sep. 5, 2023

(54) REDUCTION GEAR

(71) Applicant: SUMITOMO HEAVY INDUSTRIES, LTD., Tokyo (JP)

(72) Inventors: Masayuki Ishizuka, Kanagawa (JP); Mitsuhiro Tamura, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/751,229

(22) Filed: May 23, 2022

(65) Prior Publication Data

US 2022/0282780 A1    Sep. 8, 2022

Related U.S. Application Data

(62) Division of application No. 16/691,151, filed on Nov. 21, 2019, now abandoned.

(30) Foreign Application Priority Data

Dec. 17, 2018    (JP) .................................. 2018-235146

(51) Int. Cl.
*F16H 57/038*    (2012.01)

(52) U.S. Cl.
CPC .................................. *F16H 57/038* (2013.01)

(58) Field of Classification Search
CPC .. F16H 57/038; F16H 49/001; F16H 57/0424; F16H 57/021; F16H 2057/02091; B23C 2260/40; B25J 9/1025
See application file for complete search history.

(56) References Cited

U.S. PATENT DOCUMENTS

| 2,170,548 | A | | 8/1939 | Christian | |
|---|---|---|---|---|---|
| 3,263,521 | A | * | 8/1966 | Muller | F16H 57/03 74/606 R |
| 4,625,582 | A | * | 12/1986 | Kiryu | F16H 49/001 74/640 |

(Continued)

FOREIGN PATENT DOCUMENTS

| CN | 107097844 A | * | 8/2017 | ............. B62D 5/008 |
|---|---|---|---|---|
| DE | 10024908 A1 | * | 11/2001 | ........... F16H 49/001 |

(Continued)

OTHER PUBLICATIONS

Machine Translation of JP 2017125596A, 2017, obtained from FIT database. (Year: 2017).*

(Continued)

*Primary Examiner* — Thomas C Diaz
(74) *Attorney, Agent, or Firm* — Michael Best & Friedrich LLP

(57) ABSTRACT

A reduction gear includes a reduction mechanism and a component which constitutes the reduction gear and in which a cavity portion is provided. The reduction mechanism is not provided in the cavity portion. The component includes a reinforcement structure which is provided to partially fill an inside of the cavity portion and forms a void, which is filled with air or fluid, in the cavity portion. The cavity portion includes only one opening with respect to a space in which the reduction mechanism is accommodated or with respect to an external space, or the cavity portion is provided so as to form a closed space inside the component.

18 Claims, 6 Drawing Sheets

(56) References Cited

U.S. PATENT DOCUMENTS

| | | |
|---|---|---|
| 5,776,229 A | 7/1998 | Blanes et al. |
| 8,858,380 B2 | 10/2014 | Ishizuka et al. |
| 2012/0241439 A1 | 9/2012 | Hashimoto et al. |

FOREIGN PATENT DOCUMENTS

| | | | | |
|---|---|---|---|---|
| EP | 1 855 030 B1 | | 3/2010 | |
| GB | 334703 A | | 3/1931 | |
| JP | 2012-193799 A | | 10/2012 | |
| JP | 2017125596 A | * | 7/2017 | ............... F16H 1/32 |
| KR | 20-0410943 Y1 | | 3/2006 | |
| KR | 20080067653 A | * | 7/2008 | ........... F16H 57/021 |
| WO | WO-0103868 A1 | | 1/2001 | |

OTHER PUBLICATIONS

Machine Translation of DE 10024908A1 2001, obtained from FIT database. (Year: 2001).*
Machine Translation of CN 107097844 A, 2017, obtained from FIT database. (Year: 2017).*

* cited by examiner

REDUCTION GEAR

RELATED APPLICATIONS

This is a divisional of application Ser. No. 16/691,151 filed on Nov. 21, 2019, the contents of which are incorporated herein by reference in their entirety. This application claims benefits of Convention priority based on Japanese Patent Application No. 2018-235146, the contents of which, including the specification, the claims and the drawings, are incorporated herein by reference in their entirety.

BACKGROUND

Technical Field

Certain embodiments of the present invention relate to a reduction gear.

Description of Related Art

In a reduction gear, a cavity portion may be provided in a component constituting the reduction gear.

For example, in a reduction gear of the related art, a cavity portion for easily removing air when oil is supplied into a casing is provided in the casing.

SUMMARY

According to an embodiment of the present invention, there is provided a reduction gear having a reduction mechanism including a component which constitutes the reduction gear and in which a cavity portion is provided, in which the component includes a reinforcement structure which is provided in the cavity portion and forms a void in the cavity portion.

DETAILED DESCRIPTION

Figure 1:
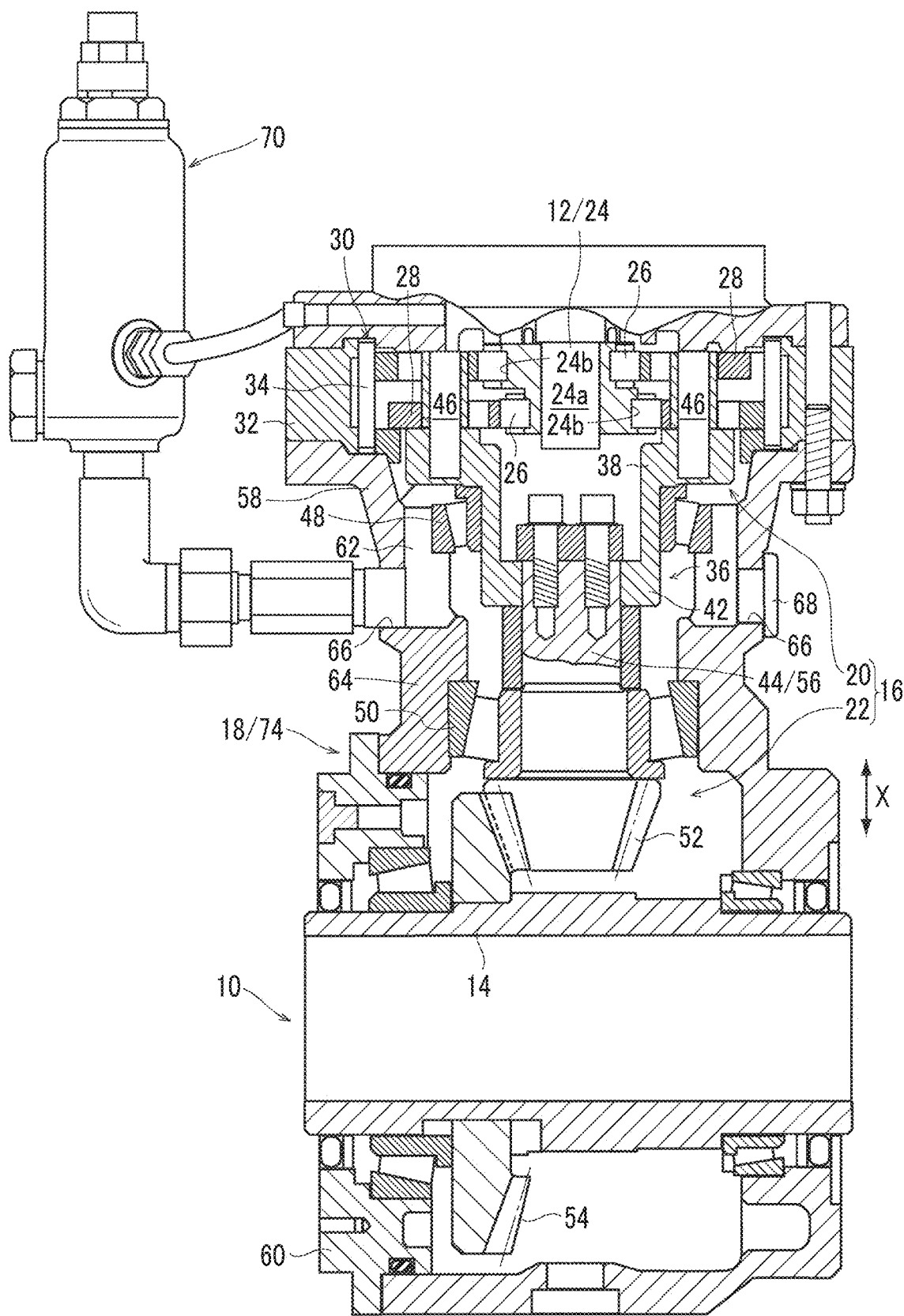
FIG. 1 is a sectional view of a reduction gear including a longitudinal section of an output member of a first embodiment.

In a case where a cavity portion is provided in a component of a reduction gear, there is a concern that strength of the component may be reduced. The inventors have recognized that there is a new measure in securing the strength of the component provided with the cavity portion.

It is desirable to provide a technology capable of securing the strength while providing the cavity portion in the component of the reduction gear.

According to the present invention, it is possible to secure the strength while providing the cavity portion in the component of the reduction gear.

Hereinafter, an example of an embodiment of the present invention will be described. The same reference numerals are assigned to the same constituent elements, and repeated descriptions are omitted. In each drawing, for convenience of explanation, some of the constituent elements are appropriately omitted, and dimensions of the constituent elements are appropriately enlarged or reduced. Each drawing is viewed according to an orientation of the reference numeral.

First Embodiment

Figure 2:
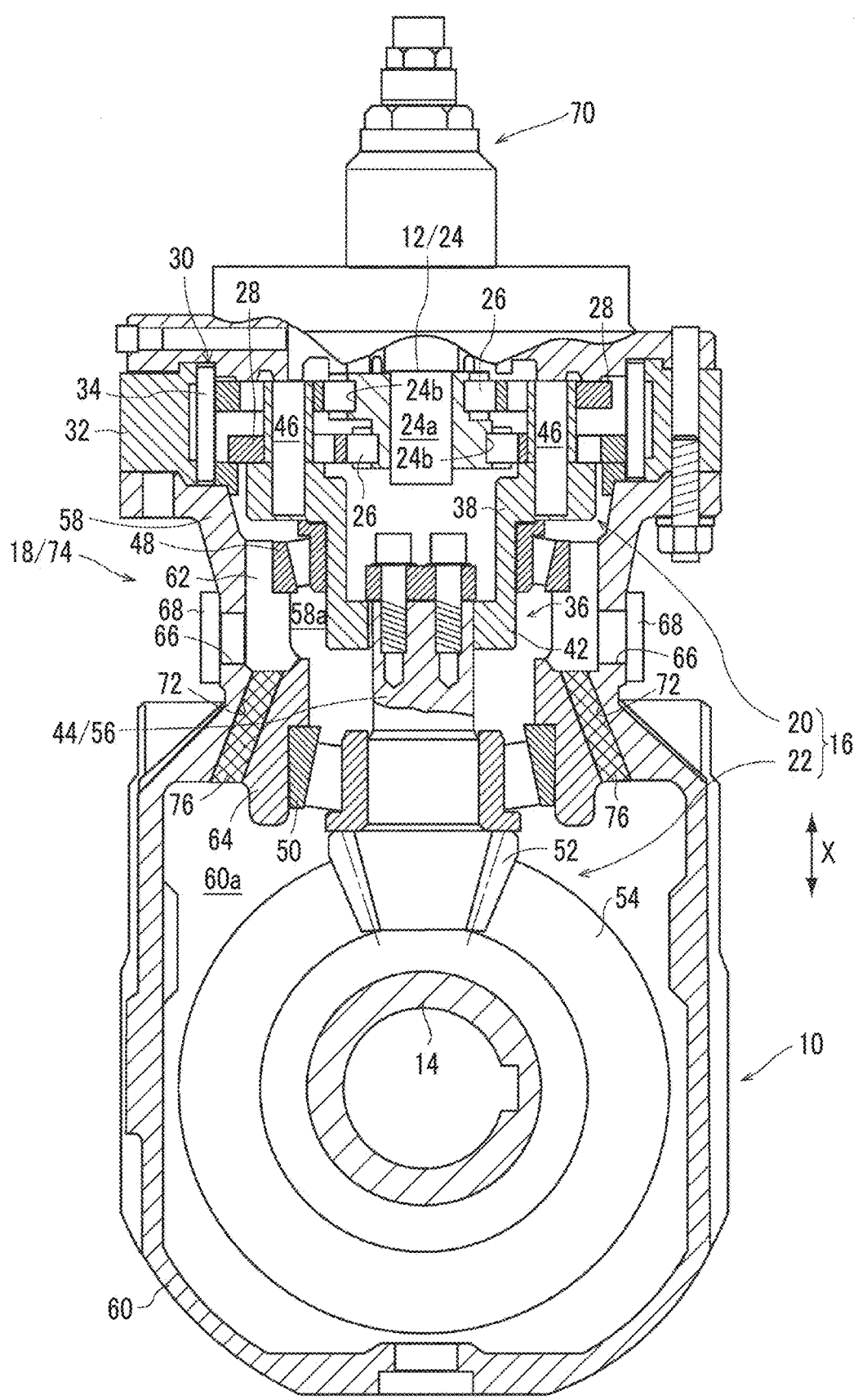
FIG. 2 is a sectional view of the reduction gear including a cross section of the output member of the first embodiment.

FIG. 1 is a sectional view of a reduction gear 10 including a longitudinal section of an output member 14 of a first embodiment. FIG. 2 is a sectional view of the reduction gear 10 including a cross section of the output member 14. The reduction gear 10 mainly incudes an input member 12, an output member 14, a reduction mechanism 16, and a casing 18.

A rotation from a drive device (not shown) is input to the input member 12. In the present embodiment, the input member 12 is constituted by an input shaft. For example, the drive device is a motor, a gear motor, an engine, or the like.

The output member 14 outputs the rotation to a driven device (not shown). In this embodiment, the output member 14 is constituted by an output shaft.

The reduction mechanism 16 is provided in a power transmission path from the input member 12 to the output member 14, decelerates the rotation input from the input member 12, and transmits the decelerated rotation to the output member 14. In the present embodiment, the reduction mechanism 16 includes a front stage reduction mechanism 20 located on a front stage side of the power transmission path, and a rear stage reduction mechanism 22 located on a rear stage side of the power transmission path. In the present embodiment, the front stage reduction mechanism 20 is an eccentric oscillation reduction mechanism, and the rear stage reduction mechanism 22 is an orthogonal axis gear mechanism. The reduction mechanism 16 is a gear mechanism including a plurality of gears.

The reduction gear 10 includes a crankshaft 24 which is rotated by the rotation of the input member 12. In the present embodiment, the crankshaft 24 doubles as the input member 12. The crankshaft 24 includes, in addition to a shaft portion 24a, a plurality of eccentric portions 24b which can rotate integrally with the shaft portion 24a. Each of the eccentric portions 24b has an axis eccentric with respect to a rotation center line of the shaft portion 24a, and can oscillate an external gear 28 described later. In the present embodiment, the eccentric portions 24b are constituted separately form the shaft portion 24a. However, the eccentric portions 24b may be constituted by a portion of the same member as the shaft portion 24a.

The front stage reduction mechanism 20 includes a plurality of the external gears 28 which are rotatably supported by the plurality of eccentric portions 24b of the crankshaft 24 via an eccentric bearing 26, and an internal gear 30 which meshes with the external gears 28. In the present embodiment, the internal gear 30 includes an internal gear main body 32 which is integrated with the casing 18, and an outer pin 34 which is provided on an inner peripheral portion of the internal gear main body 32 and constitutes an internal gear.

The reduction gear 10 includes an intermediate shaft 36 which transmits a rotation output from the front stage reduction mechanism 20 to the rear stage reduction mechanism 22.

The intermediate shaft 36 includes a carrier 38 to which the rotation of the external gear 28 is transmitted, an intermediate output shaft 42 which is integrated with the carrier 38, and an intermediate input shaft 44 which is integrated with the intermediate output shaft 42. The carrier 38 is integrated with an inner pin 46 which penetrates the external gear 28, and the rotation of the external gear 28 is transmitted to the carrier 38 via the inner pin 46. The intermediate shaft 36 functions as a connection shaft which connects the front stage reduction mechanism 20 and the rear stage reduction mechanism 22 to each other. The intermediate shaft 36 is rotatably supported by the casing 18 via a plurality of intermediate bearings 48 and 50. The intermediate bearings 48 and 50 include the first intermediate bearing 48 which supports the front stage-side portion of the intermediate shaft 36 and a second intermediate bearing 50 which supports the rear stage-side portion of the intermediate shaft 36.

The rear stage reduction mechanism 22 includes a bevel pinion 52 which is provided in the intermediate shaft 36 and a bevel gear 54 which meshes with the bevel pinion 52. The bevel gear 54 is integrated with the output member 14.

The reduction gear 10 includes a rotating member 56 rotated by the reduction mechanism 16. In the present embodiment, the rotating member 56 is the intermediate shaft 36. A direction along a rotation center line of the rotating member 56 is referred to as an axial direction X.

The casing 18 is a component of the reduction gear 10 including the reduction mechanism 16 and accommodates a component other than the casing 18 inside the casing 18. In the present embodiment, the casing 18 includes a first accommodation portion 58 which accommodates the front stage reduction mechanism 20, and a second accommodation portion 60 which accommodates the rear stage reduction mechanism 22. The first accommodation portion 58 constitutes a portion of the casing 18 on a side of the front stage reduction mechanism 20 from the second intermediate bearing 50, and the second accommodation portion 60 constitutes a portion of the casing 18 on a side of the rear stage reduction mechanism 22 side from the second intermediate bearing 50.

The casing 18 includes a first bearing disposition portion 62 in which the first intermediate bearing 48 is disposed, and a second bearing disposition portion 64 in which a second intermediate bearing 50 is disposed. The first bearing disposition portion 62 or the second bearing disposition portion 64 is provided on an inner peripheral portion of the first accommodation portion 58 of the casing 18.

In the casing 18, a through-hole 66 which allows an inside and outside of the casing 18 to communicate with each other is formed between the first bearing disposition portion 62 and the second bearing disposition portion 64. In the present embodiment, when a circumferential direction centering on the rotation center line of the rotating member 56 is referred to as a circumferential direction, a plurality of (four, in the present example) the through-holes 66 are formed at intervals in the circumferential direction. Each of the through-holes 66 is closed by a plug member 68, and can be used as an oil supply hole by removing the plug member 68. A lubricant is supplied into the casing 18 from the oil supply assembly 70 through the through-holes 66.

An operation of the above-described reduction gear 10 will be described. If a rotation is transmitted from the drive device to the input member 12, the crankshaft 24 rotates, and the external gear 28 is oscillated by the eccentric portions 24b. The external gear 28 oscillates such that an axis of the external gear 28 rotates around a rotation center line of the crankshaft 24. If the external gear 28 oscillates, a meshing position of the external gear 28 and the internal gear 30 is sequentially shifted in the circumferential direction. As a result, each time the crankshaft 24 (input member 12) rotates once, a rotation of one of the external gear 28 and the internal gear 30 occurs by an amount corresponding to a difference in the number of teeth between the external gear 28 and the internal gear 30. In the present embodiment, the internal gear 30 is fixed to an external member via the casing 18, and thus, a rotation of the external gear 28 occurs. If the external gear 28 rotates, a rotation component of the external gear 28 is transmitted to the intermediate shaft 36 via the inner pin 46, and thus, the intermediate shaft 36 rotates.

If the intermediate shaft 36 rotates, the bevel pinion 52 rotates integrally with the intermediate shaft 36, and thus, the bevel gear 54 meshing with the bevel pinion 52 rotates. If the bevel gear 54 rotates, the output member 14 rotates integrally with the bevel gear 54, and thus, the rotation is output from the output member 14 to the driven device. In this case, the rotation of the input member 12 is decelerated by a reduction ratio of the reduction mechanism 16, and thereafter, is output from the output member 14.

Please refer to FIG. 2. In the present embodiment, the reduction gear 10 includes a component 74 which constitutes the reduction gear 10 and is provided with a cavity portion 72. In the present embodiment, the component 74 is the casing 18. Originally, the cavity portion 72 of the component 74 is provided in a solid portion in the component 74. The cavity portion 72 is provided at a location different from a space accommodating a component other than the component 74. It can also be said that the cavity portion 72 is not used to accommodate a component other than the component 74.

In the present embodiment, the cavity portion 72 allows a first space 58a in the first accommodation portion 58 and a second space 60a in the second accommodation portion 60 to communicate with each other. In the present embodiment, the cavity portion 72 functions as an oil supply passage which supplies the lubricant to the second space 60a from the first space 58a when the lubricant is supplied into the casing 18 in a state where the intermediate shaft 36 is disposed vertically along a vertical direction. Further, in this case, in the present embodiment, the cavity portion 72 also functions as an air vent passage through air in the second space 60a is removed from the second space 60a to the first space 58a.

Figure 3:
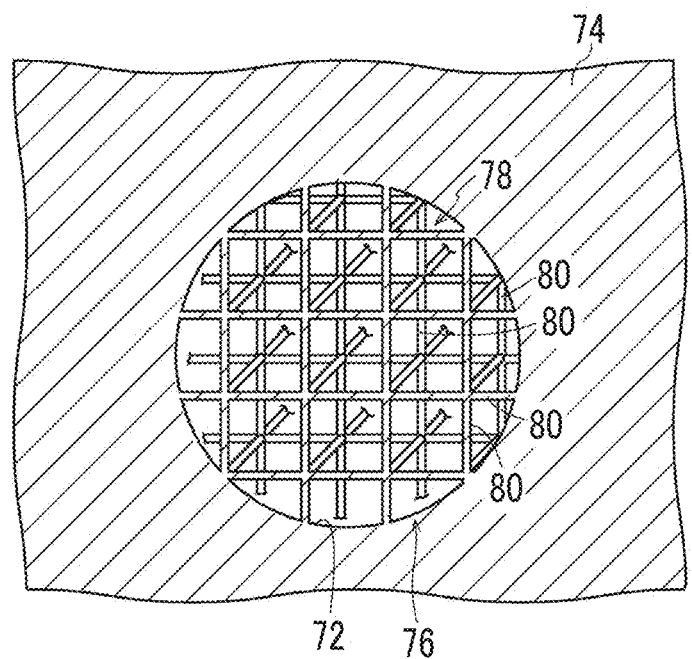
FIG. 3 is a sectional perspective view schematically showing a reinforcement structure of the first embodiment.

FIG. 3 is a sectional perspective view schematically showing a reinforcement structure 76 of the first embodiment described below. The component 74 including the cavity portion 72 has a reinforcement structure 76 which is provided in the cavity portion 72 and forms a void 78 in the cavity portion 72. In FIG. 2, the reinforcement structure 76 is shown by double hatching. The reinforcement structure 76 is used to reinforce the component 74.

The reinforcement structure 76 is configured by combining a plurality of reinforcing materials 80. In the example of FIG. 3, the reinforcement structure 76 has a lattice structure in which a plurality of linear reinforcing materials 80 are combined with each other. As the lattice structure, in the present example, a rigid-frame structure is shown, which has a quadrilateral formed by the plurality of reinforcing materials 80 as a basic unit and is constituted by an aggregate of the quadrilaterals.

Figure 4:
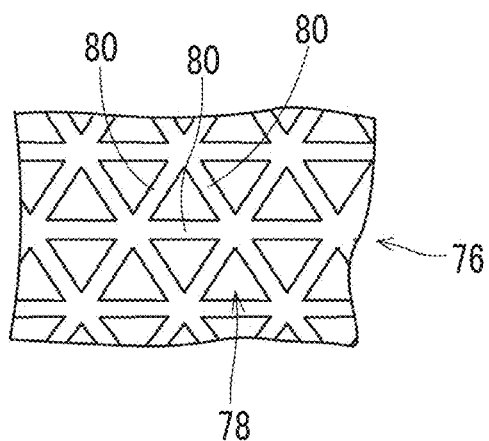
FIG. 4 is a view schematically showing a portion of a reinforcement structure of a first modification example.

FIG. 4 is a view schematically showing a portion of a reinforcement structure 76 of a first modification example. Also in the example of FIG. 4, the reinforcement structure 76 has a lattice structure in which the plurality of linear reinforcing materials 80 are combined with each other. As the lattice structure, in the present example, a truss structure is shown, which has a triangle formed by the plurality of reinforcing materials 80 as a basic unit and is constituted by an aggregate of the triangles. As in these examples, the reinforcement structure 76 may have a lattice structure in which the plurality of linear reinforcing materials 80 are regularly assembled with each other, or may have a lattice structure in which the plurality of linear reinforcing materials 80 are irregularly assembled with each other.

Figure 5:
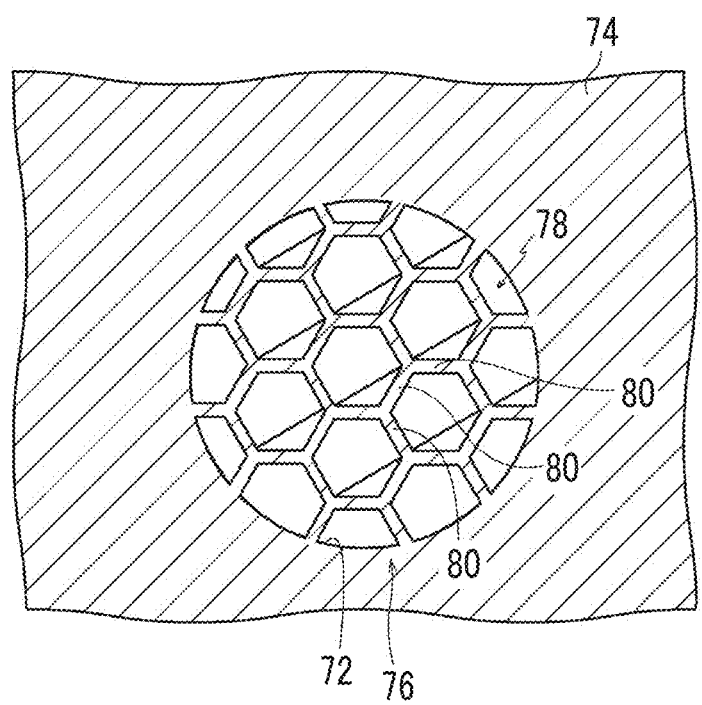
FIG. 5 is a sectional perspective view schematically showing a reinforcement structure of a second modification example.

FIG. 5 is a sectional perspective view schematically showing a reinforcement structure 76 of a second modification example. In the example of FIG. 5, the reinforcement structure 76 has a porous structure in which the plurality of reinforcing materials 80 are combined with each other. As the porous structure, in the present example, a honeycomb structure is shown, which has a predetermined shape (a hexagon in the present example) formed by a plurality of planar reinforcing materials 80 as a basic unit and is constituted by an aggregate of the predetermined shapes. The shape of the basic unit is not limited to the hexagon, and may be a quadrilateral or the like. For example, the reinforcement structure 76 may be configured by combining the plurality of linear or planar reinforcing materials 80 with each other.

The plurality of reinforcing materials 80 are integrally formed of the same member as that of an inner wall surface of the cavity portion 72 of the component 74. All the reinforcing materials 80 may not be directly connected to the inner wall surface of the cavity portion 72. That is, some reinforcing materials may be connected to the inner wall surface via other reinforcing materials 80. The reinforcement structure 76 is provided to partially fill the inside of the cavity portion 72 while forming the void 78 in the cavity portion 72. The void 78 is formed between the inner wall surface of the cavity portion 72 and the reinforcing material 80 or between the plurality of reinforcing materials 80. The above-described first space 58a and second space 60a communicate with each other through the void 78.

The component 74 including the reinforcement structure 76 is formed by three-dimensional modeling using a 3D printer. A specific example of the three-dimensional modeling is not particularly limited and may include a laser sintering system, a thermal melting lamination system, or the like, for example. A material of the component 74 to form the component 74 by the three-dimensional modeling is not particularly limited and may use a metal-based material or a resin-based material, for example. In the present embodiment, the component 74 (casing 18) is formed of a metal-based material. In the present specification, the "metal-based material" includes a cast iron, an iron-based material including steel, and an aluminum-based material including an aluminum alloy. In the present specification, the "resin-based material" includes, in addition to engineering plastic or the like, a composite material such as a carbon fiber reinforced resin and a glass fiber reinforced resin.

Return to FIG. 2. The cavity portion 72 of the component 74 is provided to extend in the axial direction X. In the present embodiment, a plurality (two in the present example) of cavity portions 72 are provided at positions at intervals in the circumferential direction. Alternatively, the cavity portion 72 may be provided to be annularly continuous around the rotation center line of the rotating member 56. The reinforcement structure 76 and the void 78 satisfy the conditions described here.

In the present embodiment, the cavity portion 72 is provided at a position overlapping the second bearing disposition portion 64 when viewed in the radial direction. In the present embodiment, the cavity portion 72 is provided radially outward of the second bearing disposition portion 64. Here, the "radial direction" refers to a radial direction of the bearing (intermediate bearing 50) disposed in the bearing disposition portion 64. This radial direction is also a radial direction centering on the rotation center line of the rotating member 56. In the present embodiment, the cavity portion 72 is provided to further extend in the axial direction X than the second bearing disposition portion 64 when viewed in the radial direction. The conditions described here are also satisfied between the reinforcement structure 76 or the void 78 and the second bearing disposition portion 64.

Effects of the above-described reduction gear 10 will be described.

(A) The reinforcement structure 76 is provided in the cavity portion 72 of the component 74 constituting the reduction gear 10. Therefore, compared to a case where the reinforcement structure 76 is not provided in cavity portion 72 of the component 74, strength of component 74 can be improved. Accordingly, it is possible to secure the strength while providing the cavity portion 72 in the component 74. In particular, by providing the cavity portion 72 in the component 74, the strength of the component 74 can be secured while reducing the weight of the component 74.

The component 74 reinforced by the reinforcement structure 76 is the casing 18. In general, the casing 18 tends to have a larger volume than other components of the reduction gear. Therefore, by providing the cavity portion 72 in the casing 18, it is possible to effectively reduce the weight of the casing 18.

In the present embodiment, a design is permitted in which the volume of an internal space (void 78) of the cavity portion 72 increases while the strength is secured by the reinforcement structure 76. Accordingly, by increasing a volume of the internal space of the cavity portion 72, the fluid can easily flow to a portion between the first space 58a and the second space 60a while the strength is secured by the reinforcement structure 76 of the component 74. Therefore, in the present embodiment, in a case where oil is supplied into the casing 18, a lubricant can easily flow from the first space 58a to the second space 60a through the cavity portion 72 of the component 74 or the air can be easily removed from the second space 60a to the first space 58a while the strength of the component 74 is secured.

(B) The cavity portion 72 of the component 74 is provided at the position overlapping the bearing disposition portion 64 when viewed in the radial direction. Since a large load is transmitted from the bearing (intermediate bearing 50) via the bearing disposition portion 64 to the vicinity of a portion in which the cavity portion 72 is located, in general, required strength in design increases. According to the present embodiment, since the reinforcement structure 76 is provided in the cavity portion 72, it is possible to easily secure the required strength at the location around the cavity portion 72.

Second Embodiment

Figure 6:
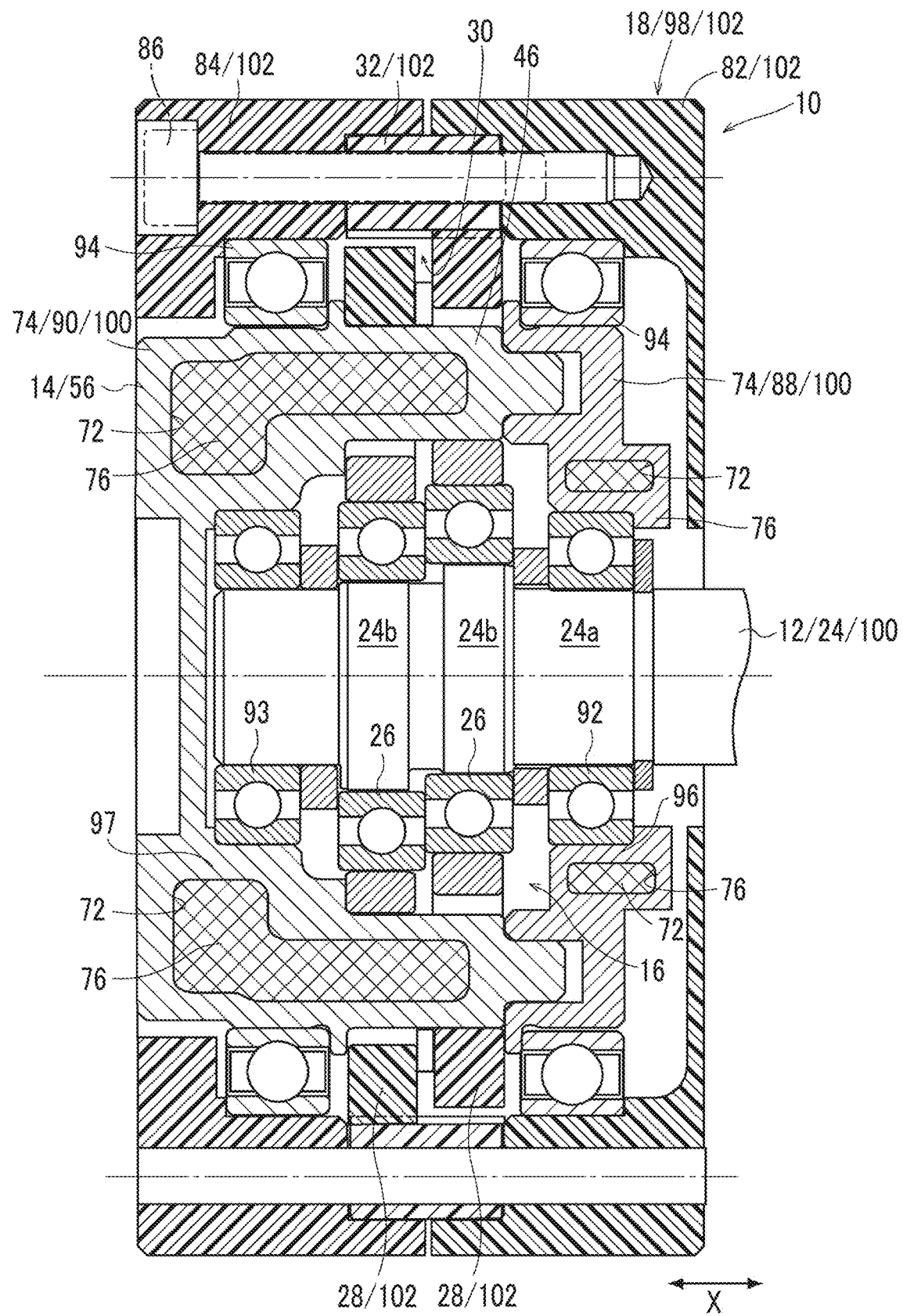
FIG. 6 is a sectional view of a reduction gear including a longitudinal section of an output member of a second embodiment.

FIG. 6 is a sectional view of a reduction gear 10 including a longitudinal section of an output member 14 of a second embodiment. In the present embodiment, the rotating member 56 rotated by the above-described reduction mechanism 16 is the output member 14.

In the present embodiment, the reduction mechanism 16 is an eccentric oscillation reduction mechanism. The reduction mechanism 16 includes a plurality of external gears 28 which are rotatably supported by a plurality of eccentric portions 24b of the input member 12 (crankshaft 24) via eccentric bearings 26, and an internal gear 30 which meshes with the external gears 28. The internal gear 30 of the present embodiment includes an internal gear main body 32 which is integrated with the casing 18, and internal teeth are provided on an inner peripheral portion of the internal gear main body 32.

A component of the reduction gear 10 including the reduction mechanism 16 is accommodated inside the casing 18. In the present embodiment, the casing 18 includes a first casing member 82 which is provided on an input side in an axial direction X and a second casing member 84 which is provided on a counter input side which is a side opposite to the input side in the axial direction X. The first casing member 82 or the second casing member 84 is integrated with internal gear main body 32 by a bolt 86.

The reduction gear 10 includes a first carrier 88 which is provided on the input side in the axial direction X with respect to the external gear 28, and a second carrier 90 which is provided on the counter input side in the axial direction with respect to the external gear 28. The first carrier 88 rotatably supports the crankshaft 24 via a first input bearing 92 and the second carrier 90 rotatably supports the crankshaft 24 via a second input bearing 93. The first carrier 88 includes a first bearing disposition portion 96 in which the first input bearing 92 is disposed and the second carrier 90 includes a second bearing disposition portion 97 in which the second input bearing 93 is disposed. The bearing disposition portions 96 and 97 are respectively provided on inner peripheral portions of the first carrier 88 and the second carrier 90.

A member fixed to the external member to support the reduction gear 10 is referred to as a fixed member 98. In the present embodiment, the output member 14 is the second carrier 90, and the fixed member 98 is the casing 18. The output member 14 is rotatably supported by the fixed member 98 via a main bearing 94.

In the present embodiment, the inner pin 46 is constituted by the same member as a portion of the second carrier 90. In a case where the second carrier 90 is the output member 14 as in the present embodiment, the inner pin 46 receives a rotation component of the external gear 28 and transmits the rotation component to the second carrier 90. Meanwhile, in a case where the carrier 90 is the fixed member 98, the inner pin 46 receives the rotation component of the external gear 28 and restrains the rotation of the external gear 28.

An operation of the above-described reduction gear 10 will be described. If the rotation is transmitted from the drive device to the input member 12, as in the first embodiment, rotation of one of the external gear 28 and the internal gear 30 occurs. In a case where the second carrier 90 is the output member 14 and the casing 18 is the fixed member 98, the rotation of the external gear 28 occurs. Meanwhile, in a case where the casing 18 is the output member 14 and the carrier 90 is the fixed member 98, the rotation of the internal gear 30 occurs. The output member 14 rotates in synchronization with the rotation component of the external gear 28 or the internal gear 30, and thus, outputs the rotation component to the driven device.

In the present embodiment, the reduction gear 10 includes a metal member 100 formed of a metal-based material and a resin member 102 made of a resin-based material. In the present embodiment, the resin member 102 is the casing 18, the external gear 28, and the internal gear 30, and the metal member 100 is a component other than these. Specifically, the metal member 100 includes the input member 12 (crankshaft 24) and the carriers 88 and 90. As described above, some of the components of the reduction gear 10 are constituted by the resin member 102, and thus, compared to a case where the components are metal members, the weight of the reduction gear 10 can be reduced. In a case where the carrier 90 is the output member 14, the carrier 90 is connected to the driven device. The carrier 90 is constituted by the metal member 100, and thus, connection strength can be secured.

Similarly to the first embodiment, the reduction gear 10 of the present embodiment also includes a component 74 which constitutes the reduction gear 10 and includes a cavity portion 72. In the present embodiment, the components 74 are the first carrier 88 and the second carrier 90. The component 74 (carriers 88 and 90) of the present embodiment also includes a reinforcement structure 76 provided in the cavity portion 72. In the present embodiment, as described above, the component 74 (carrier 88, 90) including the reinforcement structure 76 is the metal member 100.

The cavity portion 72 of the first carrier 88 is provided to extend in the axial direction X. The same applies to the reinforcement structure 76 and the void 78 (not shown) in the cavity portion 72. In the present embodiment, the cavity portion 72 of the first carrier 88 does not communicate with a space outside the first carrier 88, and is provided so as to form a closed space inside the first carrier 88. The same applies to the cavity portion 72 of the second carrier 90.

The cavity portion 72 of the first carrier 88 is provided at a position overlapping the first bearing disposition portion 96 of the first carrier 88 when viewed in a radial direction. In the present embodiment, the cavity portion 72 is provided radially outward of the first bearing disposition portion 96. In the present embodiment, the cavity portion 72 is provided to further extend in the axial direction X than the first bearing disposition portion 96 when viewed in the radial direction. The conditions described here are also satisfied between the reinforcement structure 76 or the void 78 and the first bearing disposition portion 96.

The cavity portion 72 of the second carrier 90 is provided at a position overlapping the second bearing disposition portion 97 of the second carrier 90 as viewed in the radial direction. In the present embodiment, the cavity portion 72 is provided radially outward of the second bearing disposition portion 97. In the present embodiment, the cavity portion 72 is provided to extend in the axial direction X in a range from second bearing disposition portion 97 to the inside of the inner portion of inner pin 46 when viewed in the radial direction, and the conditions described here are satisfied between the reinforcement structure 76 or the void 78 and the second bearing disposition portion 97.

The effects described in (A) and (B) above can be obtained by the above reduction gear 10 as well.

(C) In this embodiment, the component 74 reinforced by the reinforcement structure 76 is the metal member 100. Therefore, it is possible to reduce the weight of the reduction gear by constituting some of the components of the reduction gear 10 by the resin member 102, and it is possible to secure strength while reducing the weight of the metal member 100 by providing the cavity portion 72 in the metal member 100.

Third Embodiment

Figure 7:
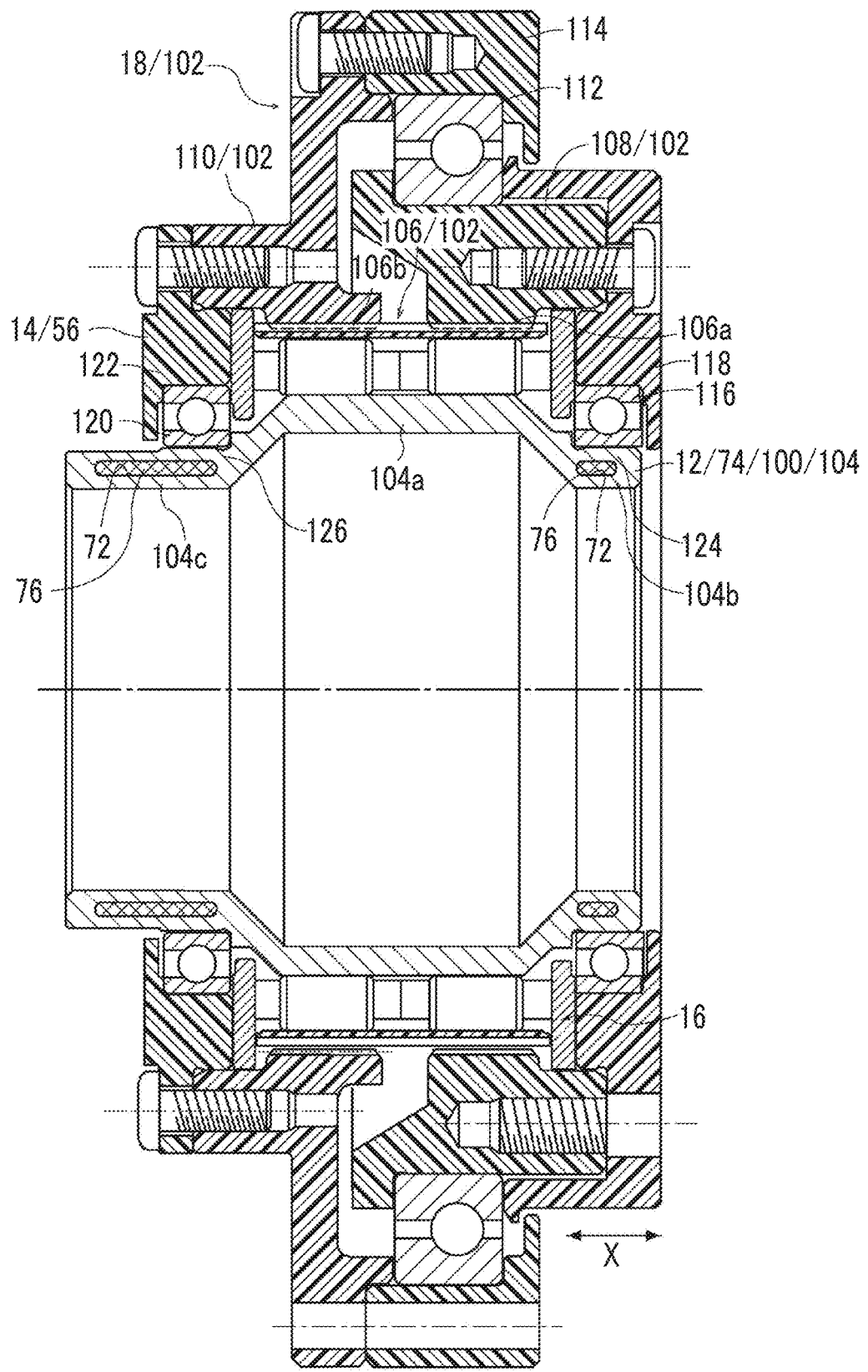
FIG. 7 is a sectional view of a reduction gear including a longitudinal section of an output member of a third embodiment.

FIG. 7 is a sectional view of a reduction gear 10 including a longitudinal section of an output member 14 of a third embodiment. In the present embodiment, a rotating member 56 rotated by the above-described reduction mechanism 16 is the output member 14.

In the present embodiment, the input member 12 is constituted by a wave generator 104 having rigidity. The wave generator 104 includes an intermediate shaft portion 104a, an input-side shaft portion 104b located closer to an input side than the intermediate shaft portion 104a, and a counter input-side shaft portion 104c located closer to a counter input side than the intermediate shaft portion 104a. In the intermediate shaft portion 104a, an outer peripheral shape of a cross section perpendicular to a rotation center line of the intermediate shaft portion 104a is elliptical. In the input-side shaft portion 104b or the counter input-side shaft portion 104c, an outer peripheral shape of a cross section orthogonal to a rotation center line thereof is circular. In the present specification, the term "ellipse" is not limited to a geometrically strict ellipse, but also includes a substantially ellipse.

In the present embodiment, the reduction mechanism 16 is a bending meshing type reduction mechanism. In the present embodiment, the reduction mechanism 16 is a so-called cylindrical bending meshing type reduction mechanism. The reduction mechanism 16 includes an external gear 106 which is disposed on an outer peripheral side of the intermediate shaft portion 104a of the wave generator 104, and internal gears 108 and 110 which meshes with the external gear 106.

The external gear 106 is a flexible tubular member. The external gear 106 includes a first external tooth portion 106a on an input side and a second external tooth portion 106b on a counter input side, which are formed on an outer peripheral portion of the external gear 106.

The internal gears 108 and 110 are annular members having such rigidity that they do not deform following a rotation of the wave generator 104. In the present embodiment, the internal gears 108 and 110 include a decelerating internal gear 108 which meshes with the first external tooth portion 106a and an output internal gear 110 which meshes with the second external tooth portion 106b. The number of internal teeth of the decelerating internal gear 108 is larger than the number of external teeth of the first external tooth portion 106a, and the number of internal teeth of the output internal gear 110 is the same as the number of external teeth of the second external tooth portion 106b. The output internal gear 110 is integrated with an annular support member 114 which rotatably supports the decelerating internal gear 108 via a main bearing 112. In the present embodiment, the output internal gear 110 or a second bearing housing 122 (described later) constitute the output member 14.

The decelerating internal gear 108 is integrated with an annular first bearing housing 118 which rotatably supports the wave generator 104 via a first input bearing 116. The output internal gear 110 is integrated with an annular second bearing housing 122 which rotatably supports the wave generator 104 via a second input bearing 120. The wave generator 104 includes a first bearing disposition portion 124 in which the first input bearing 116 is disposed, and a second bearing disposition portion 126 in which the second input bearing 120 is disposed. The bearing disposition portions 124 and 126 of the wave generator 104 are provided on an outer peripheral portion of the wave generator 104.

In the present embodiment, components of the reduction gear 10 including the reduction mechanism 16 are accommodated inside the casing 18. In the present embodiment, the casing 18 includes the decelerating internal gear 108, the output internal gear 110, the first bearing housing 118, and the second bearing housing 122 described above.

An operation of the above-described reduction gear 10 will be described. If a rotation is transmitted from the drive device to the input member 12, the wave generator 104 rotates. If the wave generator 104 rotates, the external gear 106 is continuously bent and deformed so as to conform to a shape of the intermediate shaft portion 104a of the wave generator 104 while meshing positions between the internal gears 108 and 110 and the wave generator 104 are changed in a circumferential direction. Thereby, the external gear 106 rotates relative to the decelerating internal gear 108 by an amount corresponding to a difference in the number of teeth between the decelerating internal gear 108 and the first external tooth portion 106a each time the wave generator 104 rotates once. Since the number of teeth of the output internal gear 110 is the same as that of the second external tooth portion 106b of the external gear 106, the output internal gear 110 rotates in synchronization with the same rotation component as that of the external gear 106 in a state where a relative meshing position between the second external tooth portion 106b and the output internal gear 110 is not changed, before and after the wave generator 104 rotates once. The rotation of the output internal gear 110 is transmitted from the output internal gear 110 which is the output member 14 to the driven device. In this case, the rotation of the wave generator 104 is decelerated by the reduction ratio of the reduction mechanism 16 and is output from the output member 14.

Similarly to the second embodiment, the reduction gear 10 of the present embodiment also includes a metal member 100 and a resin member 102. In the present embodiment, the resin member 102 is the casing 18, the external gear 106, and the internal gears 108 and 110, and the metal member 100 is a component other than these. Specifically, the metal member 100 includes the wave generator 104.

Similarly to the first embodiment, in the present embodiment, the reduction gear 10 also includes a component 74 which constitutes the reduction gear 10 and includes a cavity portion 72. In the present embodiment, the component 74 is the wave generator 104. The component 74 (wave generator 104) of the present embodiment also includes a reinforcement structure 76 provided in the cavity portion 72. In the present embodiment, as described above, the component 74 (wave generator 104) having the reinforcement structure 76 is the metal member 100.

The cavity portion 72 of the wave generator 104 is provided to extend in the axial direction X. The same applies to the reinforcement structure 76 and the void 78 (not shown) in the cavity portion 72. Similarly to the second embodiment, in the present embodiment, the cavity portion 72 does not communicate with a space outside the wave generator 104, and is provided so as to form a closed space inside the wave generator 104.

The cavity portion 72 of the wave generator 104 is provided at a position overlapping the first bearing disposition portion 124 of the wave generator 104 when viewed in a radial direction. In the present embodiment, the cavity portion 72 is provided radially inward of the first bearing disposition portion 124. In the present embodiment, the cavity portion 72 is provided to further extend in the axial direction X than the first bearing disposition portion 124 when viewed in the radial direction. The conditions described here are also satisfied between the reinforcement structure 76 and the second bearing disposition portion 126.

The effects described in (A), (B), and (C) above can be obtained by the above reduction gear 10 as well.

A modification example of each constituent element will be described.

A type of the reduction mechanism is not particularly limited. For example, the reduction mechanism may include a planetary gear mechanism, a parallel axis gear mechanism, or the like, in addition to an eccentric oscillation reduction mechanism, an orthogonal axis gear mechanism, and a bending meshing type reduction mechanism. The center crank type eccentric oscillation reduction mechanism is described as an example in the first embodiment and the second embodiment. However, the type of the eccentric oscillation reduction mechanism is not particularly limited. For example, a distribution type eccentric oscillation reduction mechanism in which a plurality of crankshafts 24 are disposed may be adopted. Further, in the third embodiment, the tubular bending meshing type reduction mechanism is described as an example. However, but a kind of the bending meshing type reduction gear is not particularly limited. For example, a cup-shaped or top hat-shaped bending meshing type reduction mechanism having one internal gear may be adopted. In addition, in the second embodiment, the output member 14 of the reduction gear 10 may be the casing 18 and the fixed member 98 may be the carriers 88 and 90.

A specific example of the component 74 including the reinforcement structure 76 is not limited to the examples of the embodiments. For example, the component 74 including the reinforcement structure 76 may be the internal gear, the external gear, or the like, in addition to the casing 18, the carrier, and the wave generator 104. In addition, the cavity portion 72 including the reinforcement structure 76 inside the cavity portion 72 may be provided in the component 74 at a location unrelated to bearing disposition portion.

The reinforcement structure 76 may be any structure which can reinforce the cavity portion 72 while forming the void 78 in the cavity portion 72, and a specific example of the reinforcement structure 76 is not limited to the examples of the embodiments. For example, the reinforcing materials 80 may be constituted by combining reinforcing materials 80 other than the linear or planar reinforcing material 80 with each other.

Specific examples of the first space 58*a* and the second space 60*a* with which the cavity portion 72 communicates are not particularly limited. In the embodiments, the front stage reduction mechanism 20 is accommodated in the first space 58*a*, and the rear stage reduction mechanism 22 is accommodated in the second space 60*a*. However, contents in the spaces 58*a* and 60*a* are not particularly limited.

In a case where the component 74 is a casing 18, the cavity portion 72 of the component 74 may open at any location as long as an external space and an internal space of the casing 18 do not communicate with each other. For example, in the first embodiment, the example is described, in which the cavity portion 72 of the component 74 is open at the plurality of locations inside the casing 18. Specifically, in the first embodiment, the cavity portion 72 of the component 74 is open to the inner wall surface of the first accommodation portion 58 and the inner wall surface of the second accommodation portion 60. In addition to this, the cavity portion 72 may be open at a plurality of locations outside the casing 18. Further, in the case where the component 74 is the casing 18, the cavity portion 72 of the component 74 may not be open to the casing 18. In a case where the component 74 is other than the casing 18, an opening location of the cavity portion 72 of the component 74 is not particularly limited.

A specific combination of the metal member 100 and the resin member 102 is not limited to the examples of the embodiments. Any one of the casing 18, the external gear, the internal gear, the carrier, the input member 12, or the like may be the metal member 100 or the resin member 102. In addition, all components of the reduction gear 10 may be either the metal member 100 or the resin member 102.

It should be understood that the invention is not limited to the above-described embodiment, but may be modified into various forms on the basis of the spirit of the invention. Additionally, the modifications are included in the scope of the invention. Moreover, the hatching attached to the cross sections of the drawings does not limit a material of a hatched object.

What is claimed is:

1. A reduction gear comprising:
   a reduction mechanism; and
   a component which constitutes the reduction gear and in which a cavity portion is provided,
   wherein the reduction mechanism is not provided in the cavity portion,
   wherein the component comprises a reinforcement structure which is provided to partially fill an inside of the cavity portion and forms a void, which is filled with air or fluid, in the cavity portion,
   wherein the cavity portion is provided so as to form a closed space inside the component, and
   wherein the cavity portion is provided such that an inner wall surface of the cavity portion and reinforcing materials constituting the reinforcement structure are integrally formed.

2. The reduction gear according to claim 1,
   wherein the component comprises a bearing disposition portion in which a bearing is disposed, and
   wherein the cavity portion is provided at a position overlapping the bearing disposition portion when viewed in a radial direction.

3. The reduction gear according to claim 2,
   wherein the reinforcement structure is provided at a position overlapping an overall length of the bearing disposition portion when viewed in the radial direction.

4. The reduction gear according to claim 1,
   wherein a metal member formed of a metal-based material and a resin member formed of a resin-based material are provided, and
   wherein the component is the metal member.

5. The reduction gear according to claim 1,
   wherein the reduction mechanism is a bending meshing type reduction mechanism including a wave generator and an external gear which meshes with an internal gear while being bent by the wave generator.

6. The reduction gear according to claim 5,
   wherein the component is the wave generator.

7. The reduction gear according to claim 1,
   wherein the cavity portion extends in an axial direction of a rotation shaft of the reduction mechanism and has a size which varies in a radial direction depending on the axial direction.

8. The reduction gear according to claim 1,
   wherein the reduction mechanism is a bending meshing type reduction mechanism including a wave generator and an external gear which meshes with an internal gear while being bent by the wave generator, wherein the wave generator comprises an intermediate shaft portion deforming the external gear and a first bearing disposition portion supported by a first input bearing, and wherein the component is the wave generator, and two cavity portions are provided of which one is provided inside the first bearing disposition portion in a radial direction.

9. The reduction gear according to claim 8, wherein the wave generator comprises a second bearing disposition portion supported by a second input bearing, wherein the intermediate shaft portion is provided between the first bearing disposition portion and the second bearing disposition portion, wherein the other of the cavity portions is provided inside the second bearing disposition portion in the radial direction, and wherein each length of the one of the cavity portions provided on an inner side in a radial direction of the first bearing disposition portion and the other of the cavity portions provided on an inner side in a radial direction of the second bearing disposition portion is different from each other.

10. The reduction gear according to claim 1, wherein the reduction mechanism comprises an external gear and a carrier located on a side of the external gear, and wherein the component is the carrier.

11. The reduction gear according to claim 10, wherein the carrier comprises a plurality of inner pins protruding in an axial direction, and wherein the cavity portion of the carrier extends in the axial direction within a range extending to an inside of the inner pin.

12. The reduction gear according to claim 1, wherein the cavity portion is provided such that the reinforcing materials constituting the reinforcement structure and the inner wall surface of the cavity portion are formed of the same material.

13. The reduction gear according to claim 1, wherein the cavity portion is provided such that two spaces separated by the component do not communicate with each other.

14. The reduction gear according to claim 1, wherein the reinforcement structure is a lattice structure in which a plurality of linear reinforcing materials are combined with each other, or is a porous structure in which a plurality of reinforcing materials are assembled with each other, and wherein voids formed by the reinforcement structure communicate with each other in the cavity portion.

15. The reduction gear according to claim 14, wherein the reinforcement structure is the lattice structure in which the plurality of linear reinforcing materials are regularly assembled with each other.

16. A reduction gear comprising:

a reduction mechanism; and a component which constitutes the reduction gear and in which a cavity portion is provided, wherein the reduction mechanism is not provided in the cavity portion, wherein the component comprises a reinforcement structure which is provided to partially fill an inside of the cavity portion and forms a void, which is filled with air or fluid, in the cavity portion, wherein the cavity portion is provided such that two spaces separated by the component do not communicate with each other, wherein the cavity portion is provided such that an inner wall surface of the cavity portion and reinforcing materials constituting the reinforcement structure are integrally formed, and wherein the cavity portion is provided so as to form a closed space inside the component.

17. The reduction gear according to claim 16, wherein the component is provided with a plurality of the cavity portions which do not communicate with each other.

18. A reduction gear comprising:

a reduction mechanism; and a component which constitutes the reduction gear and in which a cavity portion is provided, wherein the reduction mechanism is not provided in the cavity portion, wherein the component comprises a reinforcement structure which is provided to partially fill an inside of the cavity portion and forms a void, which is filled with air or fluid, in the cavity portion, wherein the cavity portion comprises only one opening with respect to a space in which the reduction mechanism is accommodated or with respect to an external space, or the cavity portion is provided so as to form a closed space inside the component, wherein the component comprises a bearing disposition portion in which a bearing is disposed, wherein the cavity portion is provided at a position overlapping the bearing disposition portion when viewed in a radial direction, wherein the component comprises, as the bearing disposition portion, an inner bearing disposition portion, which is provided on an inner peripheral surface of the component and in which an inner bearing is disposed, and an outer bearing disposition portion, which is provided on an outer peripheral surface of the component and in which an outer bearing is disposed, and wherein the cavity portion is provided outside the inner bearing disposition portion in the radial direction and inside the outer bearing disposition portion in the radial direction.

\* \* \* \* \*